United States Patent
Mercer et al.

(10) Patent No.: US 10,013,038 B2
(45) Date of Patent: Jul. 3, 2018

(54) DYNAMIC ANTENNA POWER CONTROL FOR MULTI-CONTEXT DEVICE

(71) Applicant: Microsoft Technology Licensing, LLC, Redmond, WA (US)

(72) Inventors: Sean Russell Mercer, Issaquah, WA (US); Charbel Khawand, Sammamish, WA (US); Marc Harper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/987,964

(22) Filed: Jan. 5, 2016

(65) Prior Publication Data

US 2017/0192478 A1    Jul. 6, 2017

(51) Int. Cl.
| | |
|---|---|
| *G06F 1/32* | (2006.01) |
| *G06F 1/28* | (2006.01) |
| *G01D 5/14* | (2006.01) |
| *G01D 5/26* | (2006.01) |
| *H01Q 1/22* | (2006.01) |
| *H01Q 3/24* | (2006.01) |
| *H01Q 21/28* | (2006.01) |
| *H04B 1/3827* | (2015.01) |
| *G06F 1/16* | (2006.01) |

(52) U.S. Cl.
CPC ............. *G06F 1/28* (2013.01); *G01D 5/142* (2013.01); *G01D 5/26* (2013.01); *H01Q 1/2266* (2013.01); *H01Q 3/24* (2013.01); *H01Q 21/28* (2013.01); *H04B 1/3838* (2013.01); *G06F 1/1654* (2013.01)

(58) Field of Classification Search
None
See application file for complete search history.

(56) References Cited

U.S. PATENT DOCUMENTS

| | | | |
|---|---|---|---|
| 4,016,490 | A | 4/1977 | Weckenmann et al. |
| 4,729,129 | A | 3/1988 | Koerner |
| 4,806,944 | A | 2/1989 | Jacomb-Hood |

(Continued)

FOREIGN PATENT DOCUMENTS

| | | |
|---|---|---|
| CN | 1179864 A | 4/1998 |
| CN | 100504407 C | 9/2006 |

(Continued)

OTHER PUBLICATIONS

Hochwald, et al., "Minimizing Exposure to Electromagnetic Radiation in Portable Devices", In Proceedings of Information Theory and Applications Workshop, Feb. 5, 2012, pp. 1-7.

(Continued)

*Primary Examiner* — Paul Yanchus, III
(74) *Attorney, Agent, or Firm* — Holzer Patel Drennan

(57) ABSTRACT

An electronic device disclosed herein includes one or more sensors for collecting data relating to a product context that an electronic device is currently placed or used in. A product context detector of the electronic device analyzes the collected data to identify the current product context, and a power controller of the electronic device alters transmission power of at least one antenna of the electronic device based on the identified product context to ensure compliance with an applicable specific absorption rate (SAR) standard.

20 Claims, 5 Drawing Sheets

(56) References Cited

U.S. PATENT DOCUMENTS

| | | |
|---|---|---|
| 5,166,679 A | 11/1992 | Vranish et al. |
| 5,212,621 A | 5/1993 | Panter |
| 5,408,690 A | 4/1995 | Ishikawa et al. |
| 5,564,086 A | 10/1996 | Cygan et al. |
| 6,178,310 B1 | 1/2001 | Jeong, II |
| 6,657,595 B1 | 12/2003 | Phillips et al. |
| 6,989,745 B1 | 1/2006 | Milinusic et al. |
| 7,009,944 B1 | 3/2006 | Hulbert |
| 7,053,629 B2 | 5/2006 | Nevermann |
| 7,062,288 B2 | 6/2006 | Raaf et al. |
| 7,071,776 B2 | 7/2006 | Forrester et al. |
| 7,124,193 B1 | 10/2006 | Raaf et al. |
| 7,146,139 B2 | 12/2006 | Nevermann |
| 7,151,382 B1 | 12/2006 | Kean et al. |
| 7,162,264 B2 | 1/2007 | Vance |
| 7,167,093 B2 | 1/2007 | Fergusson |
| 7,541,874 B2 | 6/2009 | Maeda et al. |
| 7,729,715 B2 | 6/2010 | Love et al. |
| 7,917,175 B2 | 3/2011 | Song et al. |
| 8,063,375 B2 | 11/2011 | Cobbinah et al. |
| 8,077,032 B1* | 12/2011 | Vier ............... G08B 13/26 340/3.1 |
| 8,134,461 B2 | 3/2012 | Van Doorn |
| 8,208,423 B2 | 6/2012 | Liu et al. |
| 8,213,982 B2 | 7/2012 | Marlett et al. |
| 8,269,511 B2 | 9/2012 | Jordan |
| 8,324,549 B2 | 12/2012 | Romero et al. |
| 8,326,385 B2 | 12/2012 | Brogle et al. |
| 8,401,851 B2 | 3/2013 | Bushey |
| 8,417,296 B2 | 4/2013 | Caballero et al. |
| 8,432,322 B2 | 4/2013 | Amm et al. |
| 8,442,572 B2 | 5/2013 | Borran et al. |
| 8,466,839 B2 | 6/2013 | Schlub et al. |
| 8,483,632 B2 | 7/2013 | Arsani et al. |
| 8,515,496 B2 | 8/2013 | Cheng et al. |
| 8,520,586 B1 | 8/2013 | Husted et al. |
| 8,547,952 B2 | 10/2013 | Liu et al. |
| 8,548,388 B2 | 10/2013 | Chiu et al. |
| 8,559,999 B2 | 10/2013 | Hu et al. |
| 8,565,205 B2 | 10/2013 | Ho et al. |
| 8,577,289 B2 | 11/2013 | Schlub et al. |
| 8,723,531 B2 | 5/2014 | Harrison |
| 8,723,749 B2 | 5/2014 | Lin et al. |
| 8,775,103 B1 | 7/2014 | Jayaraj et al. |
| 8,781,437 B2 | 7/2014 | Ngai et al. |
| 8,792,930 B1 | 7/2014 | Gopalakrishnan et al. |
| 8,798,695 B1 | 8/2014 | Zheng et al. |
| 8,860,526 B2 | 10/2014 | Manssen et al. |
| 8,922,443 B2 | 12/2014 | Zhu et al. |
| 8,975,903 B2 | 3/2015 | Salter et al. |
| 9,325,355 B2 | 4/2016 | Pecen et al. |
| 9,337,833 B2 | 5/2016 | Siska |
| 9,466,872 B2 | 10/2016 | Sanchez et al. |
| 2002/0009976 A1 | 1/2002 | Rashidi |
| 2002/0039028 A1 | 4/2002 | Douglas et al. |
| 2002/0175814 A1 | 11/2002 | Wadlow et al. |
| 2003/0064732 A1 | 4/2003 | McDowell et al. |
| 2003/0064761 A1 | 4/2003 | Nevermann |
| 2003/0210203 A1 | 11/2003 | Phillips et al. |
| 2003/0214310 A1 | 11/2003 | McIntosh |
| 2003/0228846 A1 | 12/2003 | Berliner et al. |
| 2004/0021608 A1 | 2/2004 | Kojima et al. |
| 2004/0075613 A1 | 4/2004 | Jarmuszewski et al. |
| 2004/0108957 A1 | 6/2004 | Umehara et al. |
| 2004/0113847 A1 | 6/2004 | Qi et al. |
| 2004/0160378 A1 | 8/2004 | Abrams et al. |
| 2004/0222925 A1 | 11/2004 | Fabrega-Sanchez et al. |
| 2005/0017906 A1 | 1/2005 | Man et al. |
| 2005/0093624 A1 | 5/2005 | Forrester et al. |
| 2005/0184914 A1 | 8/2005 | Ollikainen et al. |
| 2006/0244663 A1 | 11/2006 | Fleck et al. |
| 2007/0037619 A1 | 2/2007 | Matsunaga et al. |
| 2007/0111681 A1 | 5/2007 | Alberth, Jr. et al. |
| 2007/0120745 A1 | 5/2007 | Qi et al. |
| 2007/0122307 A1 | 5/2007 | Da Costa et al. |
| 2008/0051165 A1 | 2/2008 | Burgan et al. |
| 2008/0055160 A1 | 3/2008 | Kim et al. |
| 2008/0158065 A1 | 7/2008 | Wee |
| 2008/0218493 A1 | 9/2008 | Patten et al. |
| 2008/0254836 A1 | 10/2008 | Qi et al. |
| 2009/0033562 A1 | 2/2009 | Takeuchi et al. |
| 2009/0047998 A1 | 2/2009 | Alberth, Jr. |
| 2009/0230884 A1 | 9/2009 | Van Doorn |
| 2009/0253459 A1 | 10/2009 | Naganuma et al. |
| 2009/0295648 A1 | 12/2009 | Dorsey et al. |
| 2009/0305742 A1* | 12/2009 | Caballero ............ H04B 1/3838 455/566 |
| 2009/0325511 A1 | 12/2009 | Kim |
| 2010/0026664 A1 | 2/2010 | Geaghan |
| 2010/0052997 A1 | 3/2010 | Kan et al. |
| 2010/0056210 A1 | 3/2010 | Bychkov et al. |
| 2010/0067419 A1 | 3/2010 | Liu et al. |
| 2010/0113111 A1 | 5/2010 | Wong et al. |
| 2010/0234058 A1 | 9/2010 | Hu et al. |
| 2010/0234081 A1 | 9/2010 | Wong et al. |
| 2010/0279751 A1 | 11/2010 | Pourseyed et al. |
| 2010/0283671 A1 | 11/2010 | Levin et al. |
| 2010/0283691 A1 | 11/2010 | Su et al. |
| 2010/0317302 A1 | 12/2010 | Greenwood et al. |
| 2010/0321325 A1 | 12/2010 | Springer et al. |
| 2011/0001675 A1 | 1/2011 | Lee |
| 2011/0012793 A1 | 1/2011 | Amm et al. |
| 2011/0012794 A1 | 1/2011 | Schlub et al. |
| 2011/0043408 A1 | 2/2011 | Shi et al. |
| 2011/0063042 A1 | 3/2011 | Mendolia et al. |
| 2011/0117973 A1 | 5/2011 | Asrani et al. |
| 2011/0124363 A1 | 5/2011 | Calvarese et al. |
| 2011/0157077 A1 | 6/2011 | Martin et al. |
| 2011/0199267 A1 | 8/2011 | Hayashi |
| 2011/0222469 A1 | 9/2011 | Ali et al. |
| 2011/0250928 A1 | 10/2011 | Schlub et al. |
| 2011/0298669 A1 | 12/2011 | Rao |
| 2012/0021707 A1 | 1/2012 | Forrester et al. |
| 2012/0021800 A1 | 1/2012 | Wilson et al. |
| 2012/0023225 A1 | 1/2012 | Imes et al. |
| 2012/0044115 A1 | 2/2012 | McCaughey et al. |
| 2012/0071195 A1 | 3/2012 | Chakraborty et al. |
| 2012/0074961 A1 | 3/2012 | Herrmann |
| 2012/0077538 A1* | 3/2012 | Yun ............... H04B 1/3838 455/522 |
| 2012/0133561 A1 | 5/2012 | Konanur et al. |
| 2012/0147801 A1 | 6/2012 | Ho et al. |
| 2012/0164962 A1 | 6/2012 | Lin et al. |
| 2012/0172079 A1 | 7/2012 | Baldemair et al. |
| 2012/0178494 A1 | 7/2012 | Haim et al. |
| 2012/0190398 A1 | 7/2012 | Leukkunen |
| 2012/0214422 A1 | 8/2012 | Shi et al. |
| 2012/0223865 A1 | 9/2012 | Li et al. |
| 2012/0231784 A1* | 9/2012 | Kazmi ............... H04B 1/3838 455/423 |
| 2012/0270519 A1 | 10/2012 | Ngai et al. |
| 2012/0270592 A1 | 10/2012 | Ngai et al. |
| 2012/0276861 A1 | 11/2012 | Isobe et al. |
| 2012/0295554 A1 | 11/2012 | Greene et al. |
| 2012/0298497 A1 | 11/2012 | Maeda et al. |
| 2012/0299772 A1 | 11/2012 | Shtrom et al. |
| 2012/0315847 A1 | 12/2012 | Li et al. |
| 2012/0329517 A1 | 12/2012 | Elin |
| 2012/0329524 A1 | 12/2012 | Kent et al. |
| 2013/0005413 A1 | 1/2013 | Brogle et al. |
| 2013/0016621 A1 | 1/2013 | Kil et al. |
| 2013/0026846 A1 | 1/2013 | Gianesello et al. |
| 2013/0033400 A1 | 2/2013 | Chiang |
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0060517 A1 | 3/2013 | Sanchez |
| 2013/0120257 A1 | 5/2013 | Park et al. |
| 2013/0122827 A1 | 5/2013 | Ali et al. |
| 2013/0127677 A1 | 5/2013 | Lin et al. |
| 2013/0137487 A1 | 5/2013 | Sato |
| 2013/0149957 A1 | 6/2013 | Desclos et al. |
| 2013/0157564 A1 | 6/2013 | Curtis et al. |
| 2013/0169348 A1 | 7/2013 | Shi |

(56) References Cited

U.S. PATENT DOCUMENTS

| | | |
|---|---|---|
| 2013/0178167 A1 | 7/2013 | Lockerbie et al. |
| 2013/0178174 A1 | 7/2013 | Geris et al. |
| 2013/0203363 A1 | 8/2013 | Gratt et al. |
| 2013/0210477 A1 | 8/2013 | Peter |
| 2013/0217342 A1 | 8/2013 | Abdul-gaffoor et al. |
| 2013/0241670 A1 | 9/2013 | Mikhemar et al. |
| 2013/0278474 A1 | 10/2013 | Lenormand et al. |
| 2013/0293244 A1 | 11/2013 | Leek |
| 2013/0300618 A1 | 11/2013 | Yarga et al. |
| 2013/0310105 A1 | 11/2013 | Sagae et al. |
| 2013/0310106 A1 | 11/2013 | Wang et al. |
| 2013/0314365 A1 | 11/2013 | Woolley et al. |
| 2014/0015595 A1 | 1/2014 | Van Ausdall et al. |
| 2014/0021801 A1 | 1/2014 | Kao et al. |
| 2014/0071008 A1 | 3/2014 | Desclos et al. |
| 2014/0078094 A1 | 3/2014 | Yang |
| 2014/0087663 A1 | 3/2014 | Burchill et al. |
| 2014/0280450 A1 | 3/2014 | Luna |
| 2014/0098491 A1 | 4/2014 | Wang |
| 2014/0098693 A1 | 4/2014 | Tabet et al. |
| 2014/0066124 A1 | 5/2014 | Novet |
| 2014/0128032 A1 | 5/2014 | Muthukumar |
| 2014/0139380 A1 | 5/2014 | Ouyang et al. |
| 2014/0141733 A1* | 5/2014 | Wong .................. H04B 1/40 455/90.3 |
| 2014/0152121 A1 | 6/2014 | Ku |
| 2014/0155000 A1 | 6/2014 | Erkens |
| 2014/0159980 A1 | 6/2014 | Finegold |
| 2014/0173269 A1 | 6/2014 | Varoglu et al. |
| 2014/0176938 A1 | 6/2014 | Yang et al. |
| 2014/0177371 A1 | 6/2014 | Abbasi et al. |
| 2014/0206297 A1 | 7/2014 | Schlub et al. |
| 2014/0274188 A1 | 9/2014 | Thorson |
| 2014/0274189 A1 | 9/2014 | Moller et al. |
| 2014/0292587 A1 | 10/2014 | Yarga et al. |
| 2014/0307570 A1 | 10/2014 | Hong |
| 2014/0315592 A1* | 10/2014 | Schlub .................. H04B 1/3838 455/522 |
| 2014/0357207 A1 | 12/2014 | Ma |
| 2014/0357313 A1 | 12/2014 | Mercer et al. |
| 2014/0370929 A1 | 12/2014 | Khawand et al. |
| 2015/0031408 A1 | 1/2015 | Kalla et al. |
| 2015/0053575 A1 | 2/2015 | Bridges et al. |
| 2015/0141080 A1 | 5/2015 | Standing |
| 2015/0169093 A1 | 6/2015 | Nakao |
| 2015/0177371 A1 | 6/2015 | Abbasi et al. |
| 2015/0199042 A1 | 7/2015 | Standing et al. |
| 2015/0200444 A1 | 7/2015 | Mercer et al. |
| 2015/0201385 A1 | 7/2015 | Mercer et al. |
| 2015/0201387 A1 | 7/2015 | Khawand et al. |
| 2015/0288074 A1 | 10/2015 | Harper et al. |
| 2015/0382307 A1 | 12/2015 | Harper et al. |
| 2016/0049978 A1 | 2/2016 | Mercer et al. |
| 2016/0098053 A1 | 4/2016 | Khawand et al. |
| 2016/0164563 A1 | 6/2016 | Khawand et al. |
| 2016/0064801 A1 | 7/2016 | Lee et al. |
| 2016/0204836 A1 | 7/2016 | Lee et al. |

FOREIGN PATENT DOCUMENTS

| | | |
|---|---|---|
| CN | 102064812 A | 5/2011 |
| CN | 102077234 A | 5/2011 |
| CN | 202276339 U | 6/2012 |
| CN | 102714346 A | 10/2012 |
| CN | 103248747 A | 8/2013 |
| EP | 0843421 | 5/1998 |
| EP | 1298809 | 4/2003 |
| EP | 1469550 A3 | 12/2004 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 | 11/2011 |
| EP | 2405534 A1 | 1/2012 |
| EP | 2410661 | 1/2012 |
| EP | 2509229 A1 | 10/2012 |
| EP | 2568605 A1 | 3/2013 |
| EP | 2787780 A1 | 10/2014 |
| GB | 2293277 A | 3/1996 |
| GB | 2380359 A | 4/2003 |
| GB | 2409345 A | 6/2005 |
| JP | 2002043957 A | 2/2002 |
| JP | 2007194995 A | 8/2007 |
| WO | 200042797 | 7/2000 |
| WO | 200148858 A3 | 7/2001 |
| WO | 2004015813 A1 | 2/2004 |
| WO | 2004091046 A1 | 10/2004 |
| WO | 2005018046 A1 | 2/2005 |
| WO | 2007043150 A1 | 4/2007 |
| WO | 2009149023 A1 | 12/2009 |
| WO | 2011051554 A1 | 5/2011 |
| WO | 2011058128 A1 | 5/2011 |
| WO | 2012152103 A1 | 2/2012 |
| WO | 2012061582 | 5/2012 |
| WO | 2012091651 | 7/2012 |
| WO | 2012113754 | 8/2012 |
| WO | 2012122113 A1 | 9/2012 |
| WO | 2012122116 A1 | 9/2012 |
| WO | 2012143936 | 10/2012 |
| WO | 2012176217 A1 | 12/2012 |
| WO | 2013011352 A1 | 1/2013 |
| WO | 2013101106 | 7/2013 |
| WO | 2013103948 | 7/2013 |
| WO | 2013141791 A1 | 9/2013 |
| WO | 2013165419 | 11/2013 |
| WO | 2013169527 A1 | 11/2013 |
| WO | 2014036532 A1 | 3/2014 |
| WO | 2015134117 A1 | 9/2015 |
| WO | 2016048554 A1 | 3/2016 |
| WO | 2016111897 A1 | 7/2016 |

OTHER PUBLICATIONS

Rogerson, James, "Samsung reveals a folding phone-to-tablet prototype", http://www.techradar.com/us/news/phone-and-communiations/mobile ..nes/samsung-reveals-a-folding-phone-to-tablet-prototype-1197384, 7 pages.

Curto, et al., "Circular Loop Antenna Operating at 434 MHz for Medical Applications: Loop-Tissue Interaction", In Proceeding of: Irish Signals and Systems Conference, Jul. 2006, 6 pages.

"Digital, Silicon Microphone has 2.6 X 1.6mm2 Footprint", Published on: Dec. 28, 2005, Available at: http://news.thomasnet.com/fullstory/Digital-Silicon-Microphone-has-2-6-x-1-6-mm-footprint-471386.

Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.

I.B. Bonev et al, "Parametric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.

"Low SAR Solution for Tablet PC", Published on: Sep. 27, 2011, Available at: http://www.auden.com.tw/TRC/webspace/disk/AudenSARSolution datasheet_110927.pdf.

Mrazovac, "Reaching the Next Level of Indoor Human Presence Detection: An RF Based Solution", 11th International Conference on Telecommunications in Modern Satellite, Cable and Broadcasting Services, Oct. 16, 2013, 4 pages.

Myllymaki, "Capacitive Antenna Sensor for User Proximity Recognition"; Academic dissertation to be presented with the assent of the Doctoral Training Committee of Technology and Natural Sciences of the University of Oulu for public defence in Arina-sali (Auditorium TA105), Linnanmaa, dated Nov. 30, 2012, 59 pages.

Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.

(56) References Cited

OTHER PUBLICATIONS

Poutanen, "Interaction Between Mobile Terminal Antenna and User" Helsinki University of Technology Master's Thesis, Oct. 9, 2007, 100 pages.
Poutanen, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
"SAR Evaluation Considerations for Laptop, Notebook, Netbook and Tablet Computers," Federal Communications Commission Office of Engineering and Technology Laboratory Division, May 28, 2013, 14 pages.
"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.
Sterner, et al., "Development of an Antenna Sensor for Occupant Detection in Passenger Transportation", In Proceedings of Procedia Engineering, vol. 47, Sep. 9, 2012, 6 pages.
Toit, Riaan Du, "Using Proximity Sensing to Meet Mobile Device FCC SAR Reulations", Published on: Apr. 17, 2012, Available at: http://www.eetimes.com/General/PrintView/431201.
"Non-Final Office Action", U.S. Appl. No. 14/152,351, dated Feb. 20, 2015, 10 pages.
"Non-Final Office Action", U.S. Appl. No. 13/905,088, dated Mar. 23, 2015, 37 pages.
"Non-Final Office Action", U.S. Appl. No. 14/152,652, dated Jul. 16, 2015, 9 pages.
"Non-Final Office Action", U.S. Appl. No. 14/152,086, dated Jul. 22, 2015, 13 pages.
"Non-Final Office Action", U.S. Appl. No. 14/152,529, dated Sep. 22, 2015, 18 pages.
"Non-Final Office Action", U.S. Appl. No. 13/918,846, dated Sep. 23, 2015, 16 pages.
"Non-Final Office Action", U.S. Appl. No. 14/152,086, dated Nov. 30, 2015, 19 pages.
"Non-Final Office Action", U.S. Appl. No. 14/562,212, dated Dec. 18, 2015, 16 pages.
"Non-Final Office Action", U.S. Appl. No. 14/927,287, dated Dec. 21, 2015, 28 pages.
"Final Office Action", U.S. Appl. No. 14/152,652, dated Dec. 23, 2016, 9 pages.
"Non-Final Office Action", U.S. Appl. No. 14/320,320, dated Jan. 21, 2016, 9 pages.
"Non-Final Office Action", U.S. Appl. No. 14/152,529, dated Jan. 22, 2016, 18 pages.
Office Action Issued in United Kingdom Patent Application No. 1219096.3, dated Jan. 28, 2016, 4 Pages.
"Final Office Action", U.S. Appl. No. 13/918,846, dated Mar. 2, 2016, 20 pages.
"Non-Final Office Action", U.S. Appl. No. 14/152,652, dated Apr. 18, 2016 9 pages.
"Final Office Action Issued in U.S. Appl. No. 14/927,287", dated May 11, 2016, 34 Pages.
"Non-Final Office Action", U.S. Appl. No. 14/086,866, dated May 19, 2016, 7 pages.
Office Action Issued in Chinese Patent Application No. 201380055749.X, dated Jun. 6, 2016, 12 Pages.
"Non-Final Office Action", U.S. Appl. No. 13/918,846, dated Jun. 14, 2016, 21 pages.
"Final Office Action", U.S. Appl. No. 14/562,212, dated Jun. 17, 2016, 17 pages.
"Non-Final Office Action", U.S. Appl. No. 14/506,478, dated Jul. 1, 2016, 10 pages.
"Final Office Action", U.S. Appl. No. 14/320,320, dated Jul. 29, 2016, 10 pages.

International Searching Authority, United States Patent and Trademark Office, International Search Report and Written Opinion for Application No. PCT/US2013/066441, dated Dec. 12, 2013, 12 Pages.
International Searching Authority, United States Patent and Trademark Office, International Search Report and Written Opinion for Application No. PCT/US2014/042023, dated Aug. 29, 2014, 11 Pages.
International Searching Authority, United States Patent and Trademark Office, International Search Report and Written Opinion for Application No. PCT/US2014/039479, dated Sep. 19, 2014, 11 Pages.
International Searching Authority, United States Patent and Trademark Office, Search Report and Written Opinion for PCT/US2014/065856, dated Feb. 4, 2015, 10 pages.
International Preliminary Examining Authority, "Second Written Opinion", Application No. PCT/US2014/042023, dated Mar. 2, 2015, 6 Pages.
International Searching Authority, U.S. Patent and Trademark Office, International Search Report for PCT/US2014/072411, dated Mar. 27, 2015, 10 pages.
International Searching Authority, United States Patent and Trademark Office, International Search Report and Written Opinion for Application No. PCT/US2014/072412, dated Mar. 30, 2015, 12 Pages.
International Searching Authority, United States Patent and Trademark Office, International Search Report and Written Opinion for Application No. PCT/US2014/072414, dated Apr. 14, 2015, 9 Pages.
International Preliminary Examining Authority, United States Patent and Trademark Office, International Preliminary Report on Patentability, Application No. PCT/US2013/066441, dated May 7, 2015, 9 pages.
International Searching Authority, United States Patent and Trademark Office, International Preliminary Report on Patentability, Application No. PCT/US2014/039479, dated Jun. 15, 2015, 8 pages.
International Searching Authority, U.S. Patent and Trademark Office, International Search Report and Written Opinion for PCT/US2014/072413, dated Jul. 16, 2015, 16 pages.
International Searching Authority, U.S. Patent and Trademark Office, International Search Report and Written Opinion for PCT /US2015/037563, dated Aug. 31, 2015, 11 pages.
International Searching Authority, United States Patent and Trademark Office, Second International Search Report and Written Opinion for PCT/US2014/072412; dated Oct. 5, 2015, 11 pages.
International Preliminary Examining Authority, Second Written Opinion of the International Preliminary Examining Authority for PCT/2014/065856, dated Oct. 13, 2015, 6 pages.
Second Written Opinion Issued in PCT Application No. PCT/US2014/072411, dated Nov. 26, 2015, 7 Pages.
International Searching Authority, U.S. Patent and Trademark Office, Second Written Opinion of International Preliminary Examining Authority for PCT/US2014/072412, dated Dec. 4, 2015, 5 pages.
International Searching Authority, U.S. Patent and Trademark Office, Second Written Opinion of the International Preliminary Examining Authority for PCT/US2014/072414 dated Dec. 9, 2015, 29 pages.
International Searching Authority, U.S. Patent and Trademark Office, Second Written Opinion of the International Preliminary Examining Authority for PCT/US2014/072413 dated Dec. 17, 2015, 6 pages.
International Seraching Authority, U.S. Patent and Trademark Office, International Search Report and Written Opinion for PCT/US2015/062851, dated Feb. 5, 2016, 11 pages.
International Preliminary Examining Authority, International Preliminary Report on Patentability for PCT/US2014/065856, dated Feb. 10, 2016, 14 pages.
International Searching Authority, U.S. Patent and Trademark Office, International Search Report and Written Opinion for PCT/US2015/052769, dated Feb. 17, 2016, 27 pages.

(56) References Cited

OTHER PUBLICATIONS

International Preliminary Report of Patentability issued in PCT Application No. PCT/US2014/072412; dated Mar. 22, 2016, 7 pages.
International Preliminary Examining Authority, International Preliminary Report on Patentability for PCT/US2014/072411; dated Mar. 23, 2016, 8 pages.
International Preliminary Examining Authority, International Preliminary Report on Patentability for PCT/US2014/072414; dated Mar. 23, 2016, 7 pages.
International Preliminary Examining Authority, International Preliminary Report on Patentability for PCT/US2014/072413, dated Mar. 24, 2016, 7 pages.
International Preliminary Examining Authority, Second Written Opinion of the International Preliminary Examining Authority for PCT/2015/037563, dated Jun. 1, 2016, 5 pages.
Second Written Opinion Issued in PCT Application No. PCT/US2015/052769, dated Jul. 7, 2016, 5 Pages.
"Non-Final Office Action", U.S. Appl. No. 14/086,866, dated Oct. 17, 2016, 7 pages.
"Final Office Action", U.S. Appl. No. 13/918,846, dated Oct. 26, 2016, 25 pages.
Office Action Issued in Columbian Patent Application No. NC2016/0000122, dated Aug. 19, 2016, 2 Pages.
First Office Action and Search Report Issued in Chinese Patent Application No. 201480031132.9, dated Nov. 2, 2016, 10 Pages.
First Office Action Issued in Chinese Patent Application No. 201480033869.4, dated Dec. 19, 2016, 6 Pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 29, 2016, 16 pages.
"Second Written Opinion Issued in PCT Application No. PCT/US2015/062851", dated Oct. 28, 2016, 8 Pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively coupled Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Quddious, et al., "An inkjet printed meandered dipole antenna for RF passive sensing applications", In Proceedings of 10th European Conference on Antennas and Propagation, Apr. 2016, 4 Pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages.
Harper, "Loop Antenna With Integrated Proximity Sensing", U.S. Appl. No. 15/412,997, filed Jan. 23, 2016, 32 pages.
"Second Office Action Issued in Chinese Patent Application No. 201380055749.X", dated Jan. 25, 2017, 10 Pages.
Office Action and Search Report Issued in Chinese Patent Application No. 201480063903.02, dated Apr. 19, 2017, 11 Pages.
"Office Action Issued in Chinese Patent Application No. 201380055749.X", dated Jun. 12, 2017, 8 Pages.
Second Office Action and Search Report Issued in Chinese Patent Application No. 201480031132.9, dated Jul. 26, 2017, 12 Pages.
International Preliminary Examining Authority, International Preliminary Report on Patentability for PCT/US2015/062851, dated Feb. 22, 2017, 19 pages International Preliminary Examining Authority, International Preliminary Report on Patentability for PCT/US2015/062851, dated Feb. 22, 2017, 19 pages.
International Searching Authority, U.S. Patent and Trademark Office, International Search Report and Written Opinion for PCT/US2016/069056, dated Mar. 31, 2017, 17 pages.
"Second Written Opinion Issued in PCT Application No. PCT/US2016/069056", dated Nov. 14, 2017, 10 Pages.
"International Preliminary Report on Patentability Issued in PCT Application No. PCT/US2016/069056", dated Mar. 22, 2018, 10 Pages.

\* cited by examiner

DYNAMIC ANTENNA POWER CONTROL FOR MULTI-CONTEXT DEVICE

BRIEF DESCRIPTIONS OF THE DRAWINGS

DETAILED DESCRIPTIONS

Figure 1A:
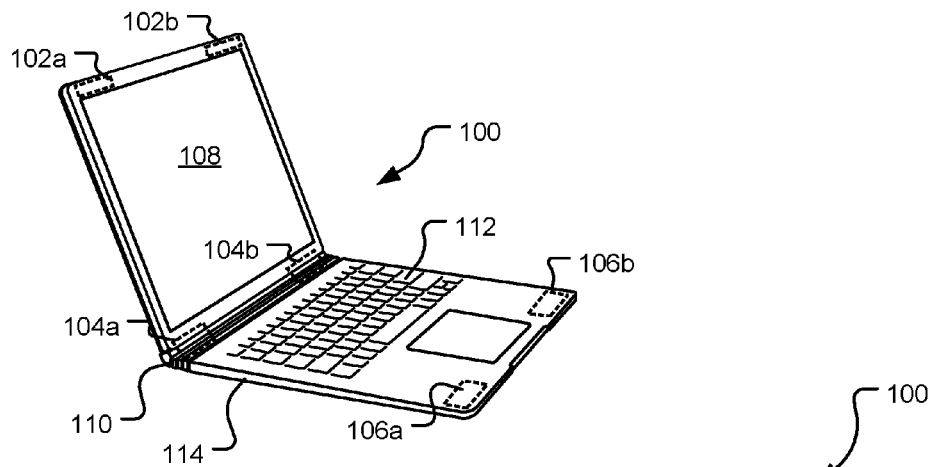
FIG. 1A illustrates an example electronic device adaptable for use in multiple product contexts and shown in a first product context.

In some jurisdictions, specific absorption rate (SAR) standards impose maximum energy absorption limits on electronic device manufacturers. These standards impose restrictions on the amount of electromagnetic radiation that may be emitted at any particular point within a given distance of a transmitting radio frequency (RF) antenna. Particular attention is given to radiation limits at distances within a few centimeters from the device (e.g., 0-3 centimeters), where users are likely to place a human body part near the transmitting antenna.

Different governing jurisdictions (e.g., the Federal Communications Commission (FCC), European Union (EU), etc.) independently set SAR standards based on a variety of criteria, and in some cases, subject electronic devices to a number of safety tests. Some SAR standards are based on device type: for example, devices that include transmitters in locations unlikely to be placed in close proximity to a user's body part may be subjected to more relaxed standards than devices designed to be gripped, held, or placed next to the body or face when in use. Still other SAR standards are based on device size and/or methods of use (e.g., purpose of the device).

There are multiple approaches to executing SAR-compliant devices. For example, some devices are calibrated to have a maximum RF transmission power that may never result in a regulatory failure (e.g., a SAR level at a "safe level" that exceeds FCC or EU-imposed transmission limits). This approach is generally feasible, for example, in laptop computers that are subjected to less stringent SAR requirements than tablets and phones. However, this "safe level" approach may not be applicable in devices subjected to more stringent SAR requirements. For example, a tablet transmitter may exhibit poor performance if designed to continuously transmit RF signal at a SAR-compliant level. For this reason, an alternative approach to SAR compliance has evolved. This alternative approach seeks to selectively lower transmission power levels at times when a user is detected within a set distance of a device or device transmitter. For example, a device may be set to transmit an RF signal at a power above a set SAR limit at some times to allow high quality radio link performance while selectively reducing transmission power when one or more device proximity sensors (e.g., capacitive sensors, infrared sensors, etc.) detect a human body part in close proximity to a transmitter.

The issue of SAR compliance is further complicated by the fact that many modern devices are adapted for use in a variety of product contexts. As used herein, the term "product context" refers to a selectable physical configuration of a product and/or a selectable method of use for the product. For example, a touchscreen device may be designed to transmit RF data when selectably attached to a keyboard or when used as a tablet without the keyboard. Likewise, a smart watch may transmit RF signal when resting on a table (e.g., on a device stand) or when worn on a user's wrist. In these varying product contexts, SAR limits for a particular device may vary. If electronic devices are designed to ensure continuous compliance with the most stringent of applicable standards (e.g., a tablet standard rather than a laptop standard), radio transmission power levels may be set low enough to impair device performance significantly in some configurations. For example, a laptop with dual functionality as a tablet may be restricted to transmit at a much lower power than a laptop that does not have such dual functionality.

Implementations described and claimed herein address the foregoing by providing methods and systems for product context detection and dynamic antenna power alteration to facilitate antenna power maximization while complying with applicable specific absorption rate (SAR) standards. According to one implementation, a method includes identifying a current product context of an electronic device based on data collected from one or more product context sensors. Responsive to the identification of the current product context, a transmission power of the device is adjusted to ensure compliance with a specific absorption rate (SAR) standard applicable to the identified product context.

For example, a device may be designed to detect its current product configuration, orientation, method of use, etc. and maximize transmission levels for the product context while ensuring SAR compliance. Various reconfigurable detectable product contexts that may be individually subjected to different SAR standards in various jurisdictions include without limitation: phones, tablets, laptops, and "phablets" (e.g., devices with a display size in a defined range between a phone and a tablet). The herein disclosed product context identification technology can be applied in a variety of situations to identify a current product context and a maximum SAR-compliant transmission corresponding to the identified product context. For example, the disclosed technology may allow for transmission power adjustments in electronic devices configured for dual functionality as laptops and tablets, phones and phablets, phones and tablets, phablets and tablets, etc.

FIGS. 1A-1D illustrate an example electronic device 100 in each of four different selectable product contexts. In these figures, the electronic device 100 is shown to be a laptop that is also capable of functioning as a tablet; however, the disclosed systems and methods of product context detection for antenna power level selection may be adapted for use in a wide variety of devices useable in different product contexts (e.g., different selectable physical configurations and/or a selectable methods of use during which RF transmission may be employed).

FIG. 1A illustrates the electronic device 100 in a first product context as a laptop computer in an open physical position. A number of example antenna locations 102a, 102b, 104a, 104b, 106a, and 106b are shown. Of these, the antenna locations 102a, 102b are proximal to upper corners of a display 108; the antenna locations 104a, 104b indicate are located on or proximal to a hinge portion 110 of the electronic device 100; and the antenna locations 106a, 106b are proximal to corners of a keyboard 112. In some implementations, the electronic device 100 includes an antenna at each of the locations 102a, 102b, 104a, 104b, 106a, and 106b; in other implementations, the electronic device 100 includes an antenna at one or more but less than all of the locations 102a, 102b, 104a, 104b, 106a, and 106b.

Governing authorities prescribe different SAR test methods for manufactures to use when setting transmission power levels in electronic devices. One example SAR test prescribes placement of a base 114 of the electronic device 100 against a SAR body phantom (not shown). In the product context of FIG. 1A, the antennas at locations 102a, 102b are far from the base 114 and the SAR body phantom. Therefore, radio power transmission may be maximized for the antennas at locations 102a and 102b without resulting in a SAR violation. In contrast, the locations 106a and 106b are close to the base 114 and to the SAR body phantom during this test. To ensure that antennas placed at 106a and 106b do not violate SAR limits, the maximum transmission power levels of these antennas may be reduced as compared to the antennas at the locations 102a and 102b. Therefore, the electronic device 100 may not perform as well when using SAR-compliant antennas placed at the locations 106a and/or 106b as compared to a similar use of SAR-compliant antennas placed at 102a and/or 102b. Likewise, various device geometrics and antenna implementation details may influence the maximum transmission performance of SAR-compliant antennas placed at the locations 104a, 104b. As exemplified by the following discussion, maximum SAR-compliant transmission levels for each of the antennas of the electronic device 100 can be different at different times, depending upon the product context (e.g., FIG. 1A, FIG. 1B, FIG. 1C, and FIG. 1D) in which the electronic device 100 is used.

Figure 1B:
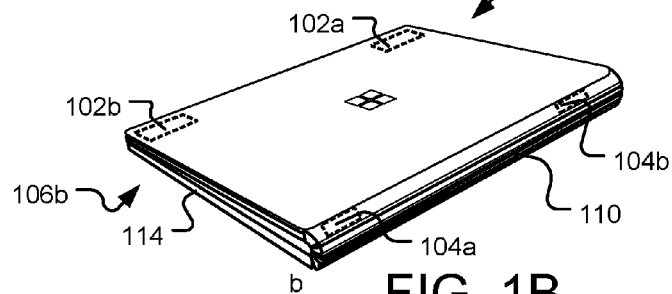
FIG. 1B illustrates the example electronic device of FIG. 1A in a second product context.

FIG. 1B illustrates the electronic device 100 in a second product context wherein the electronic device 100 resembles a laptop computer and is configured in a closed position. For some electronic devices, radios may be disabled in this product context. In other devices, radios may be enabled, such as to permit streaming of music and other audio. Devices with radios enabled in the product context of FIG. 1B may be subjected to SAR standards set by the same test described above (or other test(s), depending upon the applicable SAR-governing authority). For example, the electronic device 100 is placed in the closed position with the base 114 in contact with the SAR body phantom (not shown). During the test, RF radiation absorbed by the SAR phantom body is measured to determine a maximum-permissible transmission level under the applicable SAR standard.

In the-above described SAR test example, the antennas in the locations 104a, 104b, 106a, and 106b may contribute a similar amount of absorbable radiation to the SAR body in the product contexts of both FIG. 1A and FIG. 1B. In contrast with these antennas, the relative placement of antennas at the locations 102a, 102b relative to the SAR body is quite different when the electronic device is in the product context of FIG. 1A as compared to the product context of FIG. 1B. In some devices, this change in relative placement of the antennas at locations 102a, 102b does not affect absorption levels in the SAR phantom body enough to result in a breach of applicable SAR limits when the electronic device is closed. For instance, dielectric and/or conductive material in the keyboard 112 may provide a sufficient buffer to prevent the SAR phantom body from absorbing too much RF radiation from the antennas at locations 102a, 102b when the electronic device is closed, as in the product context of FIG. 1B. However, in other devices, the keyboard 112 does not provide a sufficient buffer to RF radiation and the antennas at locations 102a and 102b (which are SAR-compliant when the electronic device 100 is open) violate SAR limits when the electronic device is closed.

If the electronic device 100 is configured to ensure SAR compliance in all product contexts, degraded RF performance attributable to reduced antenna power (e.g., if mandated for the product context of FIG. 1B) may be inherited by the electronic device 100 when used in the product context of FIG. 1A. However, the disclosed technology overcomes this shortcoming by utilizing various sensors for product context detection to facilitate dynamic alteration of antenna power level while ensuring SAR-compliance in a variety of product contexts. For example, one or more sensors may be used to detect a current physical configuration of the electronic device 100 (e.g., an open or closed configuration). A power controller (not shown) of the electronic device 100 can then dynamically adjust the antenna power level based on the detected product context to ensure the antenna(s) of the electronic device 100 transmit at or near a maximum SAR-compliant power level for the current product context (e.g., the open laptop product context of FIG. 1A and the closed laptop context of FIG. 1B). For example, the power controller may increase the power of the antennas at the locations 102a and 102b responsive to detection of the electronic device 100 in the product configuration of FIG. 1A, and decrease power of the antennas at the locations 102a and 102b responsive to detection of the electronic device 100 in the product configuration of FIG. 1B.

Figure 1C:
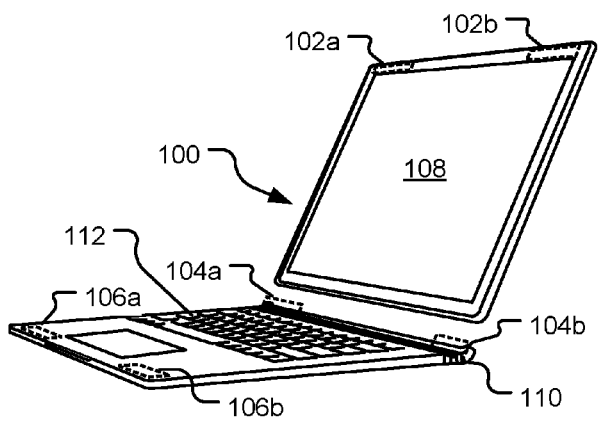
FIG. 1C illustrates the example electronic device of FIGS. 1A and 1B in a third product context.
Figure 1D:
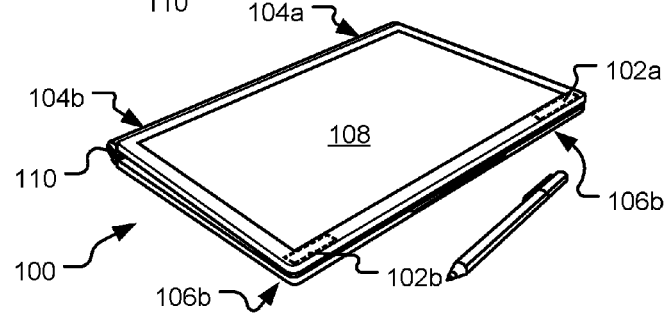
FIG. 1D illustrates the example electronic device of FIGS. 1A, 1B, and 1C in a fourth product context.

FIGS. 1C and 1D provide further examples of detectable product contexts. Specifically, FIG. 1C illustrates the electronic device 100 in a third product context wherein a top portion including a display 108 is separated from a bottom portion including the keyboard 112. In jurisdictions that impose SAR limits based on device type, the top portion including the display 108 (hereinafter "the tablet portion") may no longer be considered a "laptop." Rather, the tablet portion of the electronic device 100 may now be subjected to SAR limits pertaining to tablets. Depending on the applicable SAR-governing authority, a different SAR test may be prescribed for tablets than laptops. In one example SAR tablet test, multiple faces of the tablet portion of electronic device 100 are placed into direct contact with the SAR phantom body. For example, the test may mandate that RF emissions absorbed by the SAR body are not to exceed applicable limits when fives of the six faces of the tablet are placed into direct contact with the SAR phantom body (not shown). Notably, this example test is more stringent than the above-described test for laptops, which prescribes for placement of a single side of the electronic device 100 in contact with a SAR phantom body.

If the transmission power for antennas at the locations 102a, 102b is maximized according to a more lenient SAR test for laptop computers (e.g., as also applicable in the product contexts of FIG. 1A or 1B), the high power levels permissible under the more lenient test are likely to result in an illegal SAR condition when a top portion of the electronic device 100 is subjected to a SAR test designed for tablets. One approach to SAR compliance is therefore to set the maximum antenna power levels for the tablet portion low enough to ensure compliance with the legal requirements for tablets. However, this may result in inferior performance of the electronic device 100 when used as a laptop (as in FIG. 1A) as compared to potential performance of the electronic device 100 or as compared to competitor devices that are not detachable. Some implementations of the disclosed technology address this device performance challenge by detecting an engagement status (e.g., attached/detached) of the electronic device 100 and dynamically altering antenna power based on the detected engagement status. For example, the electronic device 100 may include one or more product context sensors for detecting an engagement status that provides feedback to a power controller. Various examples of detecting engagement status are shown and described with respect to FIG. 2, below.

FIG. 1D illustrates the electronic device 100 in a fourth product context with the display 108 and keyboard 112 reconnected, but with the tablet portion of the electronic device reversed in position as compared to FIG. 1B so that the display 108 is visible to the user. Depending on the applicable SAR-governing authority, the electronic device 100 may be subjected to either a stringent SAR testing method designed for tablets, a more lenient SAR testing method designed for laptops, or a different test entirely. If a testing method for laptops is applied (e.g., as described above with respect to FIG. 1A), a maximum SAR-compliant power level for antennas at the locations 102a and 102b may be different in the product context of FIG. 1D from the maximum SAR-compliant power level of the same antennas under the same 'laptop' test when the electronic device 100 is configured in the product context of FIG. 1A and/or FIG. 1B. Accordingly, some implementations of the electronic device 100 include sensors for detecting orientation of different device components (e.g., display facing up v. display facing down), allowing for deliberate antenna power level selection to ensure transmission at a maximum SAR-permissible power level in each device orientation.

A variety of sensors may be useful in detecting a current product context. Some sensors are useful in detecting a physical configuration (open/closed); others are useful in detecting an engagement status (e.g., attached/detached); and still others are useful in detecting orientation (e.g., facing up/facing down) or a configuration of use (e.g., worn or currently being carried v. sitting on a flat surface). Different implementations of the disclosed technology utilize these sensors both alone and in various combinations with one another. Output of the various product sensors is provided to a power controller that selectively varies antenna power based on an intelligent assessment of the current product context.

One example product context sensor useful in detecting whether the electronic device 100 is open or closed (e.g., as in FIG. 1A or FIG. 1B) is a hall effect sensor, which includes a transducer that varies its output voltage in response to changes in a detected magnetic field. For example, hall sensors may be included in proximity to magnets that are proximal to the hall sensor in a first product context (e.g., open laptop) and distal to the hall sensor in a second product context (e.g., closed laptop). Other product context sensors detect an engagement status (e.g., differentiating the product context of FIG. 1C from the product contexts of FIGS. 1A, 1B, and 1D). Several example "engagement status" product context sensors are described in greater detail with respect to FIG. 2.

Still countless other product sensors are useful in detecting physical configurations, orientation, and information relating to the current environment in which the electronic device is used. Suitable product context sensors include without limitation, optical sensors, heat sensors, gyroscopes, accelerometers, electrical circuits, cameras, audio sensors, and user input detection mechanisms (e.g., keyboard, touchpad). For example, a photometer may be positioned near the display of the electronic device 100 to determine which direction the display is facing. A lower light input measurement of the photometer may indicate the electronic device 100 is likely folded and closed (e.g., the product context of FIG. 1B) while a higher light input measurement may tend to indicate the device is open (e.g., the product context of FIG. 1A). Image-recognition software may similarly be employed to determine when a human face is detected by a camera of the device. Depending on the location of the camera, recognition of the human face may correspond to the product context of FIG. 1A or of the product context of FIG. 1B.

In still another implementation, the electronic device 100 includes proximity sensors in addition to product context sensors. The proximity sensors are selectively switched on when the electronic device is detected in certain product contexts (e.g., by data collected from the product context sensors). If, for example, the electronic device 100 is operating in a laptop mode (e.g., as in FIG. 1A), more relaxed SAR standards may apply and dynamic transmission (e.g., power back-off) techniques may not be utilized. If, in contrast, the electronic device 100 is detected in a tablet mode (e.g., as in FIG. 1C), the proximity sensors may be switched on to facilitate selective reductions in antenna transmission when humans are detected in 'dangerous' proximity of one or more device antennas. For example, antennas of the electronic device 100 may be permitted to broadcast at a high transmission power so long as the proximity detectors do not indicate that a human is within a distance likely to result in a SAR violation. In the event that one or more of the proximity sensors are triggered, the electronic device 100 may temporarily reduce the transmission power level, such as according to one or more 'back-off' tables stored in memory.

In some cases, a single product context sensor is alone insufficient to positively identify a current product context. For example, a hall effect sensor may be useful in distinguishing an "open" product context from a "closed" product context but more information may be helpful in positively identifying which one of the multiple "open" product contexts (e.g., FIG. 1A or 1C) or multiple "closed" product contexts (e.g., FIG. 1B or FIG. 1D) the electronic device 100 is currently in. Further, a hall effect sensor may be used to determine whether a kickstand, mount, stand, or other mechanism used to position or locate a device is deployed. In these cases, multiple product context sensors can be used in combination to identify the product context. For example, output voltage of a hall effect sensor can be supplemented by light collection and/or imaging techniques (e.g., image recognition, infrared imaging, etc.) that are useful in distinguishing the "closed" product contexts (e.g., FIGS. 1B and 1D) from one another. Likewise, various engagement detection sensors, such as those described with respect to FIG. 2, below, may be employed to distinguish between the different "open" product contexts (e.g., FIGS. 1A and 1C). Other implementations may make similar use of a variety of other types of sensors, including without limitation sensors that detect orientation and position (e.g., gyroscopes, magnetometers), sensors that detect typing (indicating keyboard is accessible), and sensors that detect motion (e.g., accelerometers, vibration sensors).

Figure 2:
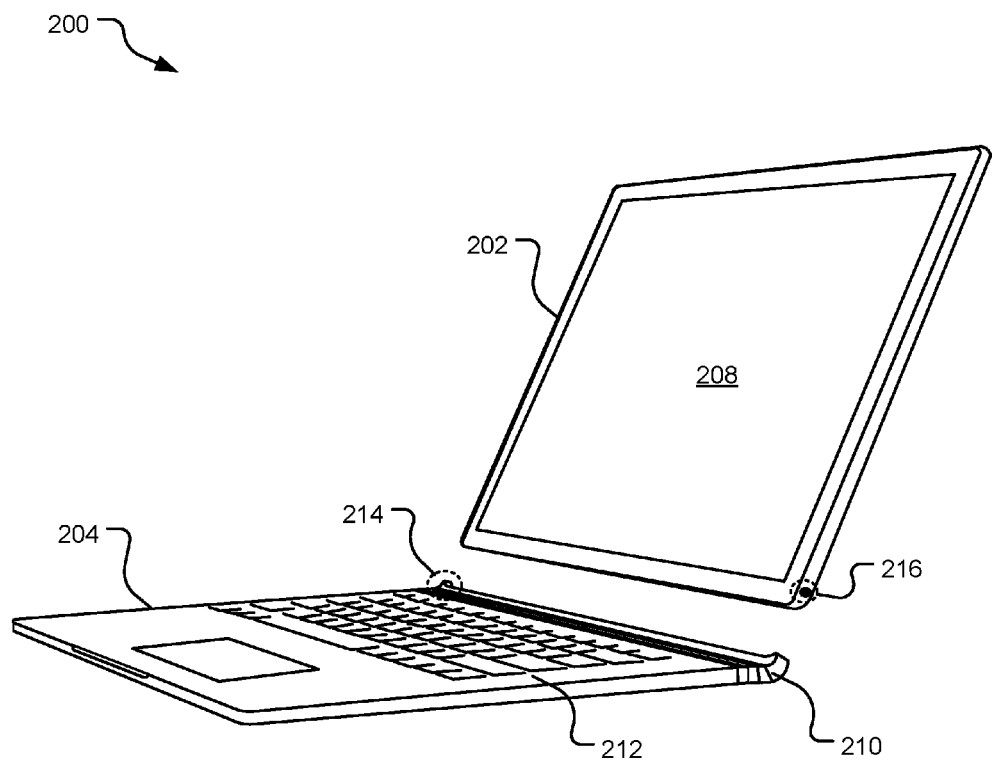
FIG. 2 illustrates another example electronic device adapted for use in multiple product contexts.

FIG. 2 illustrates another example electronic device 200 adapted for use in multiple product contexts. The electronic device 200 includes a top part 202, including a display 208, and a bottom part 204, including a keyboard 212 and a hinge portion 210. The top part 202 is configured to selectively detach and attach to the bottom part 204 via the hinge portion 210. For reasons discussed above with respect to FIGS. 1A-1D, a maximum SAR-compliant antenna power level may be different when the top part 202 and the bottom part 204 are attached to one another than when such components are detached from one another. Accordingly, the electronic device 200 includes at least one product context sensor (e.g., product context sensors 214, 216) to facilitate detection of a current engagement status between the top part 202 and the bottom part 204 (e.g., attached or detached).

In one implementation, the electronic device 200 employs infrared (IR) or optical sensors for engagement sensing. For example, the product context sensor 214 in the bottom part 204 may include a light projection source and light sensor within or adjacent to the hinge portion 210 of the electronic device 200. When the bottom part 204 is separated from the top part 202 (as shown), light from the light projection source is detectable by the light sensor, indicating a "detached" product context. When the bottom part 204 is engaged with the top part 202 via the hinge portion 210, a light path is blocked so that light from the projection source is no longer detectable by the light sensor, thereby indicating an "attached" product context. In some implementations, it is the product context sensor 216 in the top part 202 of the electronic device 200 rather than the bottom part 204 that includes a light projection source and light sensor.

In still other implementations, one or more of the product context sensors 214, 216 include an optical path that straddles multiple components of the electronic device 200. For example, a projection source of the optical path may exist in the top part 202 and a light sensor may exist in the bottom part 204, or vice versa. Light may be continuously or periodically projected through the optical path in one of the multiple parts and detection or non-detection of the light in the opposing part(s) can map to a state change (e.g., high/low) serving as input to a computer processing unit (CPU) or radio modem configured with a logic (hardware and/or software) that selects an RF power control paradigm to impose on device antennas in each detected state. As a result, detection of the state change facilitates dynamic selection of a maximum SAR-permissible antenna power for each individual antenna of the electronic device 200 corresponding to a current detected state.

In yet other implementations, one or more of the product context sensors 214, 216 include a mechanical actuator that engages or disengages with an electrical switch to break or make a connection in the detached and attached product contexts, respectively. This state change (e.g., open or closed electrical connection) can serve as an input to a CPU or radio modem as described above.

In still another implementation, one or more of the product sensors 214, 216 is formed by electrical conductors connected to form a circuit across the hinge portion 210 of the electronic device 200 when the top part 202 and the bottom part 204 are attached to one another. A subsequent detachment of the top part 202 and the bottom part 204 alters the state of an electrical signal through the circuit, providing a usable state change to adjust antenna transmission power. This type of circuit could be implemented, for example, via a resistance measurement that changes dramatically when the components detach from one another and open the circuit. The engagement sensing techniques described above may also be used to detect product context in three or more selectively attachable and detachable device components.

Figure 3A:
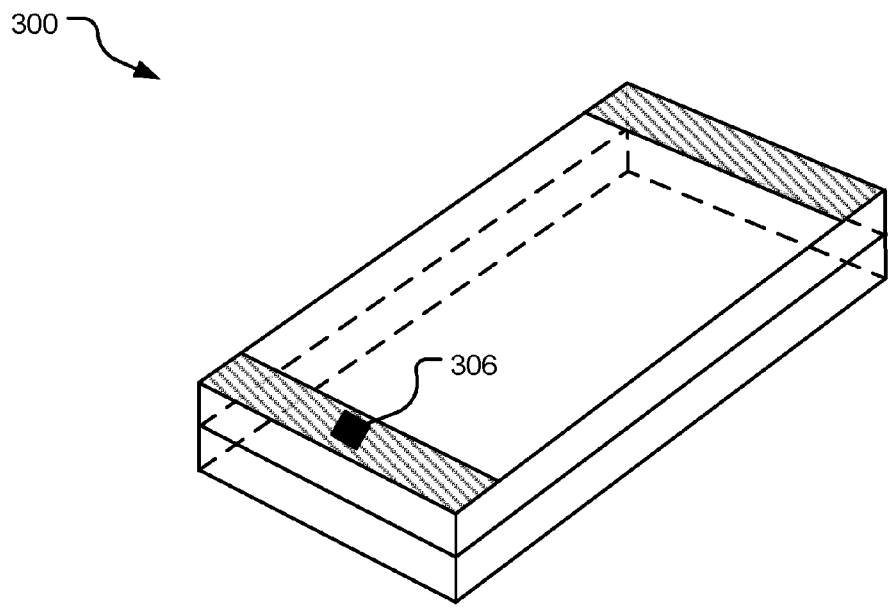
FIG. 3A illustrates yet another example electronic device shown in a first product adapted for use in multiple product context and shown in a first product context.
Figure 3B:
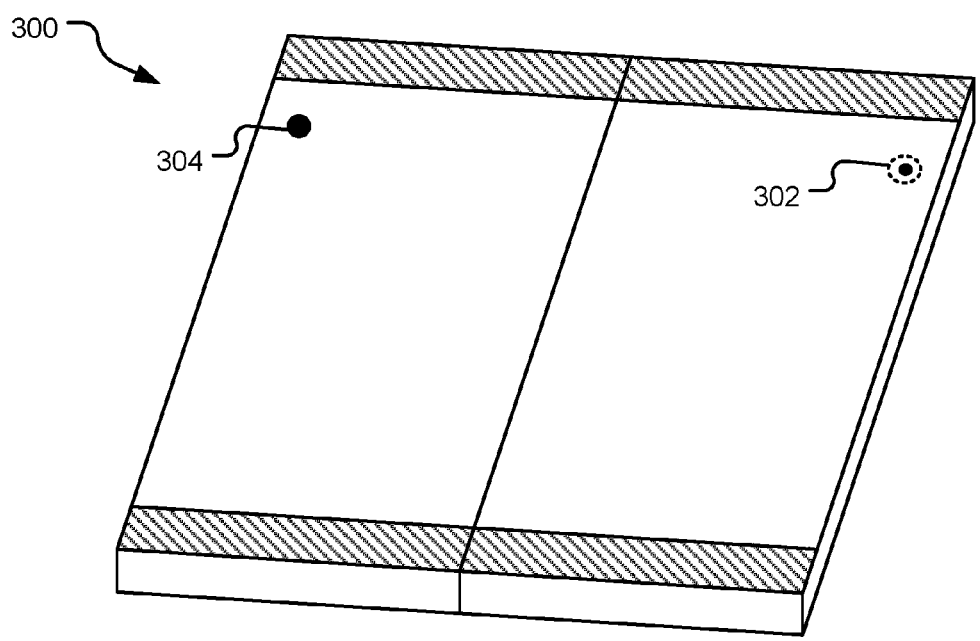
FIG. 3B illustrates the example electronic device of FIG. 3A in a second product context.

FIGS. 3A-3B illustrate yet another example of an electronic device 300 adaptable for use in different product contexts. The electronic device 300 is a foldable product, such as a phone that converts to a tablet. In FIG. 3A, the electronic device 300 is illustrated in a first product context, folded in half (such as to facilitate use of the electronic device 300 as a phone). In FIG. 3B, the electronic device is illustrated in a second product context, unfolded (such as to facilitate use as a tablet).

As described above, some SAR-governing authorities prescribe different SAR tests for manufactures setting antenna power levels in different types of handheld devices. Accordingly, phones and tablets may be subjected to different SAR tests and different SAR standards. The determination of whether a device is a phone or a tablet may be based on a dimension of the device. For example, the FCC defines a "phone" as a device having a diagonal dimension of 15 centimeters (cm) or less and mandates SAR testing for phones based on an artificial head phantom test (e.g., to measure amount of RF radiation absorbed by a user's head). In contrast, the FCC defines a "tablet" as a device having a diagonal dimension of 20 cm or greater and mandates SAR testing for tablets that is based on a flat body phantom test (e.g., similar to the tablet test described with respect to FIG. 1C). The FCC mandates that devices having diagonal dimensions between "phones" and "tablets" (e.g., greater than 15 cm and less than 20 cm) be designed to pass both sets of SAR tests (e.g., phantom head and phantom body).

In general, SAR standards applying to phones are less stringent that SAR standards applying to tablets (e.g., higher maximum transmission powers are permitted under the "phantom head" phone test than the "phantom body" tablet test). Consequently, an antenna power that is SAR-compliant in the product context of FIG. 3A may violate applicable SAR standards when used in the product context of FIG. 3B. If the transmitter of the electronic device 300 is set at a lower level that ensures continuous compliance with the SAR standards for the product context of FIG. 3B, device performance may suffer during use in the product context of FIG. 3A. To address these challenges, the electronic device 300 includes at least one product context sensor (e.g., a product context sensor 302 shown in FIG. 3B) for detecting between the product contexts of FIGS. 3A and 3B, and a power controller (not shown) for dynamically altering antenna power based on the detected product context.

In one implementation, the product context sensor 302 of FIG. 3B includes a hall effect sensor and magnets (e.g., a magnet 304) on the two halves of the electronic device 300. The magnets may provide proper alignment of the device halves in the folded position, and the hall effects sensor detects changes in the magnetic field attributable to movement of the magnets, corresponding to two different logic states (e.g., folded and unfolded). The hall effect sensor(s) can then be used to independently determine whether the electronic device 300 is in the product context of FIG. 3A or in the product context of FIG. 3B.

In one implementation, a first logic state of the hall effect sensor is associated in memory of the electronic device 300 with cellular and Wi-Fi radio power tables set to ensure SAR-compliance for phones, while a second logic state of the hall effect sensor is associated in memory with a second set of cellular and Wi-Fi radio power tables set to ensure SAR-compliance for tablets. For example, a radio power table may identify a high antenna power to be applied as a default and one or more alternative "back-off" power levels to be applied when other device conditions are satisfied, such as conditions relating to user proximity detection. The electronic device 300 may further include a power controller that governs antenna power levels according to either the first or second set of cellular and Wi-Fi radio power tables based on the detected logic state. In other implementations (described below), the power controller of the electronic device 300 selects an appropriate set of cellular and Wi-Fi radio power tables based on information in addition to a detected logic state (e.g., folded or unfolded).

Regardless of whether the device is folded or unfolded, as shown in FIGS. 3A and 3B, respectively, SAR standards are not violated unless the device is in close proximity to a user. Therefore, there may be instances when the device meets a legal definition of a "tablet" (e.g., as exemplified by FIG. 3B), but the less conservative power tables pertaining to phones can be applied, facilitating an increase in transmission power without a risk of violating a SAR standard. For example, the electronic device 300 may be legally defined as a "tablet" in the device configuration of FIG. 3B, but pose no risk of harm (e.g., excessive RF absorption) when resting on a table at a safe distance from a user. This is an example of a product context that is specific to both physical configuration (e.g., folded, unfolded) and configuration of use (e.g., a mobile, hand-held use or a stationary use).

To detect product contexts specific to configuration of use and physical configuration, the electronic device 300 may utilize data from a hall effect sensor in conjunction with other sensor data to select between multiple available radio power tables and/or settings. For example, the electronic device 300 may include an accelerometer and a mechanism for comparing accelerometer data with a signal profile that identifies human-specific movements. The accelerometer data may be analyzed to determine whether the electronic device 300 is being held by a user or not (e.g., lying flat on a table). If the accelerometer data indicates that the electronic device 300 is likely being held by a user or resting on a user's lap, the electronic device 300 may elect to set antenna power conservatively, such as according to a radio power table pertaining to tablets. If, however, the accelerometer data indicates that the electronic device 300 is stationary (e.g., on a flat surface), the antenna power can be set less conservatively, such as according to a setting or table designed for a phone or even another higher power setting that allows for higher performance than the settings and/or tables pertaining to phones and tablets.

In still other implementations, the electronic device 300 may be configured to select a transmitter power based on a configuration of use independent of physical configuration. For example, some versions of the electronic device 300 may not "fold" as shown in FIGS. 3A and 3B. Rather, the electronic device 3A may permanently assume the appearance of a tablet (e.g., a larger screen with a diagonal dimension of greater than about 20 cm), while offering the ability to make calls and otherwise function as a phone. In this case, the electronic device 300 may be configured to use other sensing techniques to determine whether the electronic device 300 is being used as a tablet or a phone and to select a maximum SAR-compliant transmission power. Some configurations of use (such as the stationary v. mobile use instances described above) can be detected by other sensors including without limitation gyroscopes, magnetometers, heat sensors, etc. For example, a gyroscope sensor measurement corresponding to a vertical orientation may indicate that the electronic device is being used as a phone while a gyroscope sensor measurement corresponding to a horizontal orientation may indicate that the device is being used as a tablet. In some implementations, these sensors are used in conjunction with one or more sensors designed to sense other physical configuration (e.g., orientation, attachment/detachment) to determine a current product context.

As in the devices described above with respect to FIGS. 1A-1D and FIGS. 2A and 2B, the electronic device 300 in FIGS. 3A and 3B may include one or more cameras (e.g., a camera 306 in FIG. 3A) to detect the presence or absence of a human user. This human detection capability may aid in the determination of a current physical device configuration or placement of the device relative to environmental surroundings (e.g., where the camera is facing a room versus a flat table or base surface) and may also aid in the determination of a current configuration of use (e.g., a placement of the electronic device 300 relative to a user). For example, camera-captured imagery could serve as input to a decision-making CPU, with conservative power settings and/or "back-off" power levels of a table being applied exclusively when the imagery includes a user.

Some SAR-governing authorities define a grace period (e.g., 30 seconds) for adjusting power levels to be SAR-compliant responsive to detection of a user within an unsafe proximity of an antenna transmitter. Where applicable, this grace period could be leveraged to save device power, perhaps by executing short, infrequent bursts of camera activity rather than continuous camera activity. Further, some SAR-governing authorities mandate SAR-compliance on average, over an interval. For example, SAR standards of the FCC represent absorption limits not to be violated over any 30 second interval. By intelligently using product context information derived from a variety of sensors, multiplexor logic may be leveraged to switch between different antennas of an electronic device when an active antenna is in a use configuration in close proximity to a user. By switching transmitter power from one antenna to a next using patterns derived from the sensing methods disclosed herein, RF absorption can be intelligently driven, on average, to a level below SAR limits for a given product context.

In some further implementations of the electronic device 300, proximity sensing is selectively enabled and disabled based on detected product contexts. If, for example, data from product context sensors indicates that the electronic device 300 is being used as a laptop, proximity sensing may be disabled (e.g., if the applicable SAR-governing authority imposes relaxed SAR standards for laptops). If, in contrast, data from product context sensors indicates that the product is being used as a tablet or phone, proximity sensing can be enabled to help identify times when a user is within an 'unsafe' distance of the antenna(s) and likely to trigger a SAR violation. Proximity sensing information can, in turn, be input to a power controller implementing a dynamic antenna power "back-off" procedure.

Figure 4:
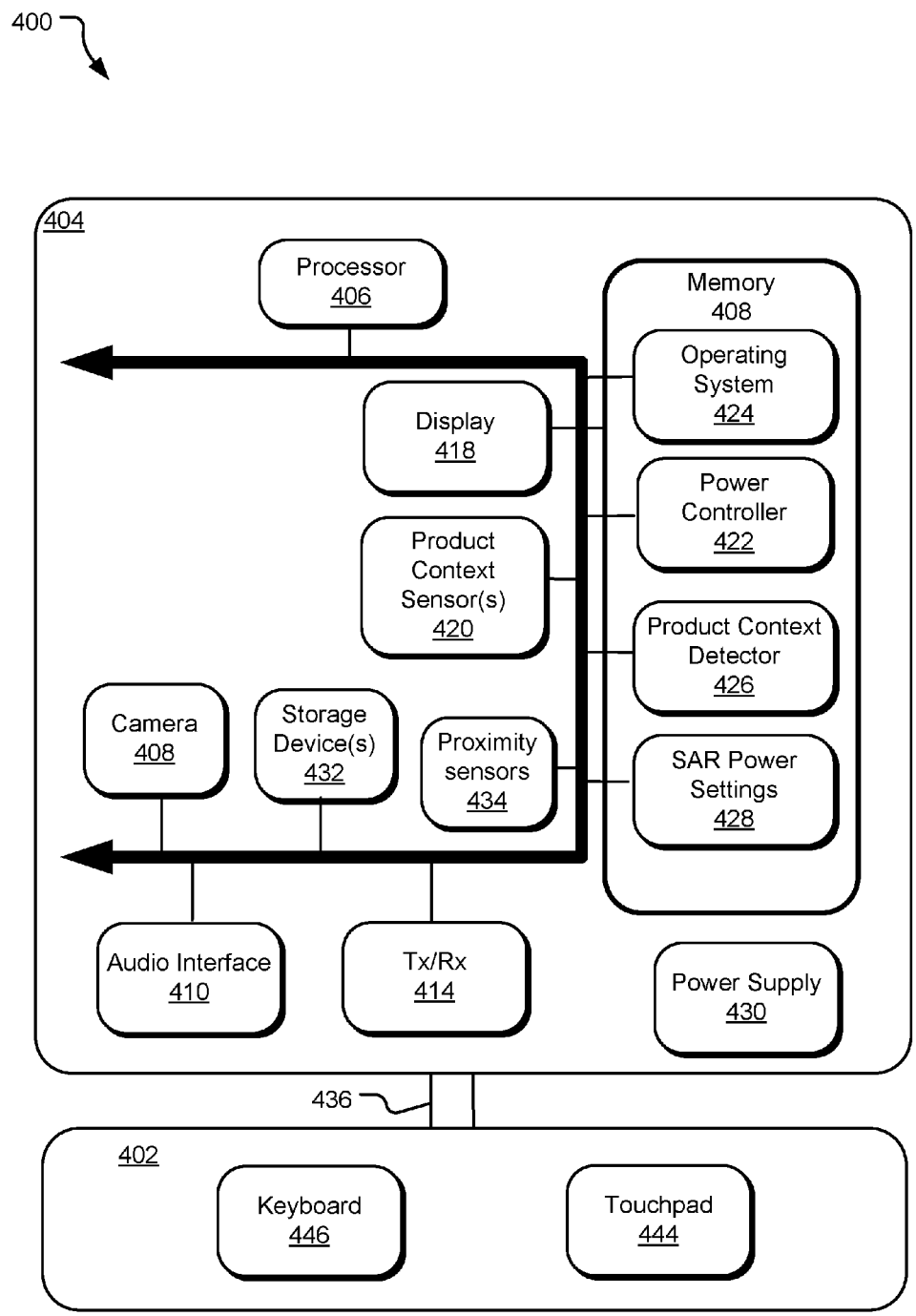
FIG. 4 illustrates an example electronic device with product context detection capability for managing antenna transmitter power.

FIG. 4 illustrates another example electronic device 400 with product context detection capability for managing antenna transmitter power. The electronic device 400 includes a detachable interconnect 436 for attaching and detaching a first component 402 and a second component 404. Other implementations may include a single component without the detachable interconnect 436 or other detachable components; still other implementations may include more than one detachable interconnect 436, such as for connecting three or more removably connectable components.

In FIG. 4, the detachable component 402 includes one or more user input mechanisms such as a keyboard 446 and a touchpad 444, and the second component 404 of the electronic device 400 includes a processor 406, a memory 408, and a display 418 (e.g., a touchscreen display). The memory 408 generally includes both volatile memory (e.g., RAM) and non-volatile memory (e.g., flash memory). An operating system 424, including hardware and/or software such as the Microsoft Windows® Phone operating system, resides in the memory 408 and is executed by the processor 406, although it should be understood that other operating systems may be employed.

A product context detector 426 is loaded into the memory 408 and executed on the operating system 424 by the processor 406. The product context detector 426 receives input from one or more product context sensors 420 of the electronic device 400 to detect a current product context. The product context sensors 420 may take on a variety of forms and provide different types of information to the product context detector 426, including without limitation information relating to physical configuration, method of use, current activities of the device, information related to external surroundings of the electronic device 400, etc. Example product context sensors 420 may include within limitation: one or more hall effect sensors and magnets, electrical circuits, cameras (e.g., as in the camera 408), optical sensors such as IR sensors, gyroscopes, magnetometers, audio sensors (e.g., as in audio interface 410), and keyboard input detection mechanisms.

The product context detector 426 provides the detected product context information to a power controller 422, which is also loaded into the memory 408 and executable by the processor 406. Based on a current product context received as input from the product context detector 426, the power controller 422 dynamically alters a transmission power level of one or more antennas 414 of the electronic device 400. The power controller 422 selects the antenna transmission power from SAR power settings 428 loaded into the memory 408 in association with different product contexts. The SAR power settings 428 may include, for example, default transmission levels for different product contexts and/or power back-off tables governing dynamic reductions in power to be imposed responsive to satisfaction of certain user-transmitter proximity conditions (e.g., as detected by proximity sensors 434).

The electronic device 400 includes a power supply 430, which is powered by one or more batteries or other power sources and which provides power to other components of the electronic device 400. The power supply 430 may also be connected to an external power source that overrides or recharges the built-in batteries or other power sources.

In an example implementation, a mobile operating system, various applications, and other modules and services may be embodied by instructions stored in memory 408 and/or storage devices 432 and processed by the processor 406.

The electronic device 400 may include a variety of tangible computer-readable storage media and intangible computer-readable communication signals. Tangible computer-readable storage can be embodied by any available media that can be accessed by the electronic device 400 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by electronic device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Figure 5:
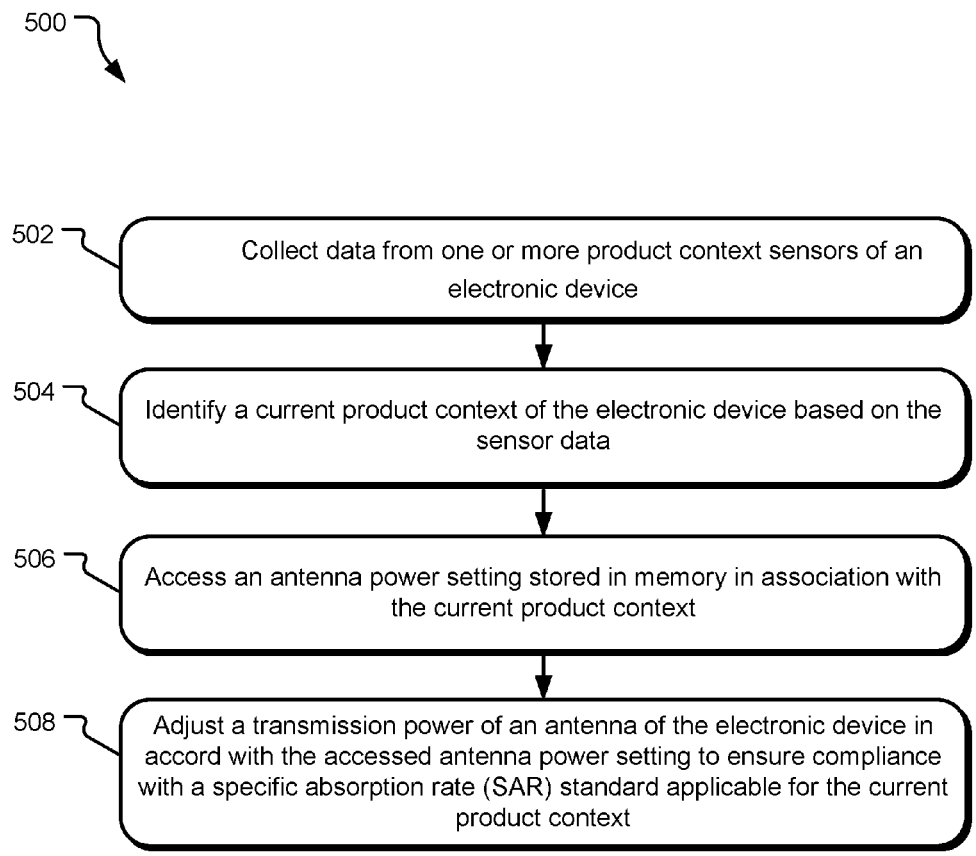
FIG. 5 illustrates example operations for utilizing product context detection to facilitate dynamic alteration of antenna power level while ensuring SAR-compliance for a variety of product contexts.

FIG. 5 illustrates example operations 500 for utilizing product context detection to facilitate dynamic alteration of antenna power level while ensuring SAR-compliance in a variety of product contexts. A collection operation 502 collects data from one or more product context sensors of an electronic device, and an identification operation 504 identifies a product context that an electronic device is currently placed or used in (e.g., a "current product context") based on an analysis of the sensor data collected via the collection operation 502. Responsive to the identification operation 504, an accessing operation 506 accesses an antenna power setting stored in memory in association with the current product context. In one implementation, the antenna power setting is stored in a back-off table governing SAR-compliant transmitter power for the current product context in association with other information, such as proximity detection information.

An adjusting operation 508 adjusts transmission power of at least one antenna of the electronic device to a level specified by the antenna power setting retrieved via the accessing operation 506. The adjustment to the power level ensures on-going compliance with a specific absorption rate (SAR) standard applicable for the current product context.

An example method identifies a current product context of an electronic device based on data collected from one or more product context sensors. Based on at least the identification of the current product context, transmission power of the electronic device is adjusted to ensure compliance with a specific absorption rate (SAR) standard applicable to the identified product context.

In another method of any preceding method, the current product context specifies a placement of the electronic device relative to surroundings in an external environment. In still another method of any preceding method, collecting the data further comprises sensing an engagement status of a mechanical interconnect of the electronic device.

In another method of any preceding method, collecting the data comprises sensing transmission of light through a mechanical interconnect with an optical sensor.

Another method of any preceding methods further comprises sensing a position of the electronic device with a hall effect sensor.

In yet another method of any preceding method, the identification of the product context is based on data from multiple different sensors.

Another method of any preceding method further comprises turning on one or more proximity sensors responsive to the identification of the current product context.

An example electronic device includes at least one product context sensor, at least one memory device, at least one processing device, a power controller, and a product context detector stored in the at least one memory device and executable by the at least one processing device. The product context detector configured to analyze data from the at least one product context sensor to identify a current product context. The power controller alters antenna transmission power of the electronic device based at least on the current product context to ensure compliance with a specific absorption rate (SAR) standard.

In another example electronic device of any preceding electronic device, the current product context is a selectable mechanical configuration of the electronic device.

In still another example electronic device of any preceding electronic device, the power controller is further configured to turn on one or more proximity sensors responsive to the identification of the current product context.

In another example electronic device of any preceding electronic device, at least one product context sensor is configured to sense an engagement status of a mechanical interconnect of the electronic device.

In another example electronic device of any preceding electronic device, at one product context sensor is an optical sensor configured to sense transmission of light through a mechanical interconnect.

In another example electronic device of any preceding electronic device the at least one product context sensor is a hall effect sensor.

One or more tangible computer-readable storage media encodes computer-executable instructions for executing on a computer system an example computer process. The example computer process includes identifying a current product context of an electronic device based on data collected from one or more product context sensors. Based at least on the identification of the current product context, transmission power of the electronic device is adjusted to ensure compliance with a specific absorption rate (SAR) standard applicable to the identified product context.

In another tangible computer-readable storage media of any preceding computer-readable storage media, the current product context is a selectable mechanical configuration of the device. Another tangible computer-readable storage media of any preceding computer-readable storage media further encodes computer executable instructions to turn on one or more proximity sensors responsive to the identification of the current product context.

Still another tangible computer-readable storage media of any preceding computer-readable storage media further encodes computer executable instructions for collecting the data by sensing an engagement status of a mechanical interconnect of the device.

Another tangible computer-readable storage media of any preceding computer-readable storage media further encodes computer executable instructions for collecting the data by sensing transmission of light through a mechanical interconnect with an optical sensor.

Another tangible computer-readable storage media of any preceding computer-readable storage media further encodes computer executable instructions for collecting the data by sensing a position of the electronic device with a hall effect sensor.

Another example method includes a means for identifying a current product context of an electronic device based on data collected from one or more product context sensors. Based on at least the identification of the current product context, a means for transmission power adjustment adjusts transmission power of the electronic device to ensure compliance with SAR standard application to the identified product context.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method comprising:
identifying a change from a first product context of an electronic device to a second product context of the electronic device based on data collected from one or more product context sensors, the first product context corresponding to a first applicable specific absorption rate (SAR) standard and the second product context corresponding to a second applicable SAR standard; and
based at least on the identification, adjusting a transmission power of the electronic device to ensure compliance with the second SAR standard.

2. The method of claim 1, wherein the second product context is a selectable configuration of the electronic device.

3. The method of claim 1, wherein the second product context is identified based on a placement of the electronic device relative to surroundings in an external environment.

4. The method of claim 1, wherein collecting the data further comprises:
sensing an engagement status of a mechanical interconnect of the electronic device.

5. The method of claim 1, wherein collecting the data further comprises:
sensing transmission of light through a mechanical interconnect with an optical sensor.

6. The method of claim 1, wherein collecting the data further comprises:
sensing a position of the electronic device with a hall effect sensor.

7. The method of claim 1, wherein the identification of the change from the first product context to the second product context is based on data from multiple different sensors.

8. The method of claim 1, further comprising:
turning on one or more proximity sensors responsive to the identification of the change from the first product context to the second product context.

9. An electronic device comprising:
at least one product context sensor;
at least one memory device;
at least one processing device;
a product context detector stored in the at least one memory device and executable by the at least one processing device, the product context detector configured to analyze data from the at least one product context sensor to identify a change from a first product context to a second product context, the first product context corresponding to a first applicable specific absorption rate (SAR) standard and the second product context corresponding to a second applicable SAR standard; and
a power controller that alters antenna transmission power of the electronic device responsive to the identified change from the first product context to the second product context to ensure compliance with the second SAR standard.

10. The electronic device of claim 9, wherein the second product context is a selectable mechanical configuration of the electronic device.

11. The electronic device of claim 9, wherein the power controller is further configured to turn on one or more proximity sensors responsive to the identified change from the first product context to the second product context.

12. The electronic device of claim 9, wherein the at least one product context sensor is configured to sense an engagement status of a mechanical interconnect of the electronic device.

13. The electronic device of claim 9, wherein the at least one product context sensor is an optical sensor configured to sense transmission of light through a mechanical interconnect.

14. The electronic device of claim 9, wherein the at least one product context sensor is a hall effect sensor.

15. One or more tangible computer-readable storage media encoding computer-executable instructions for executing on a computer system a computer process, the computer process comprising:
identifying a change from a first product context of an electronic device to a second product context of the electronic device based on data collected from one or more product context sensors, the first product context corresponding to a first applicable specific absorption rate (SAR) standard and the second product context corresponding to a second applicable SAR standard; and
based at least on the identification, adjusting a transmission power of the electronic device to ensure compliance with the second SAR standard.

16. The one or more tangible computer-readable storage media of claim 15 wherein the second product context is a selectable mechanical configuration of the device.

17. The one or more tangible computer-readable storage media of claim 15 wherein the computer process further comprises:
turning on one or more proximity sensors responsive to the identification of the change from the first product context to the second product context.

18. The one or more tangible computer-readable storage media of claim 15, wherein collecting the data further comprises:
sensing an engagement status of a mechanical interconnect of the device.

19. The one or more tangible computer-readable storage media of claim 15, wherein collecting the data further comprises:
sensing transmission of light through a mechanical interconnect with an optical sensor.

20. The one or more tangible computer-readable storage media of claim 15, wherein collecting the data further comprises:
sensing a position of the electronic device with a hall effect sensor.

* * * * *